United States Patent
Miyahara

(10) Patent No.: US 7,307,657 B2
(45) Date of Patent: Dec. 11, 2007

(54) VIDEO SIGNAL PROCESSING METHOD AND DEVICE FOR PROCESSING LUMINANCE SIGNAL

(75) Inventor: Hiroyuki Miyahara, Kanagawa-ken (JP)

(73) Assignee: Victor Company of Japan, Limited, Yokohama (JP)

( * ) Notice: Subject to any disclaimer, the term of this patent is extended or adjusted under 35 U.S.C. 154(b) by 1043 days.

(21) Appl. No.: 10/386,461

(22) Filed: Mar. 13, 2003

(65) Prior Publication Data

US 2003/0151681 A1 Aug. 14, 2003

Related U.S. Application Data

(62) Division of application No. 09/203,718, filed on Dec. 2, 1998, now Pat. No. 6,559,886.

(30) Foreign Application Priority Data

| Dec. 4, 1997 | (JP) | ................................. P9-334548 |
| Dec. 4, 1997 | (JP) | ................................. P9-334558 |
| Dec. 4, 1997 | (JP) | ................................. P9-334607 |

(51) Int. Cl.
*H04N 5/00* (2006.01)
*H04N 9/68* (2006.01)
*H04N 9/73* (2006.01)
*H04N 9/083* (2006.01)

(52) U.S. Cl. .................. 348/228.1; 348/606; 348/607; 348/623; 348/237; 348/279

(58) Field of Classification Search ............... 348/607, 348/606, 237, 623, 228.1, 226.1, 234, 235, 348/273, 279, 282, 618, 619
See application file for complete search history.

(56) References Cited

U.S. PATENT DOCUMENTS

| 4,962,426 A | * | 10/1990 | Naoi et al. ................... 348/623 |
| 4,984,074 A | * | 1/1991 | Uomori et al. ............. 348/623 |
| 5,119,195 A | * | 6/1992 | Christopher ................. 348/623 |
| 5,166,783 A | * | 11/1992 | Hodgson ..................... 348/104 |
| 5,267,028 A | * | 11/1993 | Suga et al. ................. 348/237 |
| 5,351,141 A | * | 9/1994 | Tsuji et al. ................. 348/645 |
| 5,767,899 A | * | 6/1998 | Hieda et al. ................ 348/235 |
| 5,815,011 A | * | 9/1998 | Schultz ....................... 348/623 |
| 6,078,357 A | * | 6/2000 | Yamamoto et al. ......... 348/237 |
| 6,148,116 A | * | 11/2000 | Park et al. .................. 348/623 |

(Continued)

OTHER PUBLICATIONS

Lubin; "Adaptive Coring Techniques for Spatio-temporal Signals"; Oct. 7-9, 1991; Proceedings of the IEEE Workshop on Visual Motion; pp. 333-339.*

*Primary Examiner*—John M. Villecco
(74) *Attorney, Agent, or Firm*—The Nath Law Group; Jerald L. Meyer; Stanley N. Protigal

(57) ABSTRACT

In a video signal processing method of processing a luminance signal of a video signal generated by causing a CCD to receive light transmitted through color filters, a control signal yf1 is generated by calculating Cy/Y using a complementary color signal Cy and a luminance signal Y, and coring correction is performed to the luminance signal by using the control signal yf1. The characteristic difference between the color filters is suppressed, and, as a result, flickers are suppressed from being generated.

18 Claims, 10 Drawing Sheets

U.S. PATENT DOCUMENTS 6,175,596 B1 * 1/2001 Kobayashi et al. ......... 348/606
6,721,000 B1 * 4/2004 Lin et al. ................. 348/228.1
2002/0080281 A1 * 6/2002 Yoshiyama et al. ......... 348/623

* cited by examiner

| msw | CORING RANGE | kys |
|---|---|---|
| — | | 16 |
| 0 | vck1≦yf1 | 16 |
| 0 | vck2≦yf1<vck1 | 12 |
| 0 | vck3≦yf1<vck2 | 10 |
| 0 | vck4≦yf1<vck3 | 8 |
| 0 | 0≦yf1<vck4 | 4 |
| 1 | vck1≦yf1 | 4 |
| 1 | vck2≦yf1<vck1 | 8 |
| 1 | vck3≦yf1<vck2 | 10 |
| 1 | vck4≦yf1<vck3 | 12 |
| 1 | 0≦yf1<vck4 | 16 |

VIDEO SIGNAL PROCESSING METHOD AND DEVICE FOR PROCESSING LUMINANCE SIGNAL

This application is a divisional application of U.S. patent application Ser. No. 09/203,718, filed Dec. 2, 1998, now U.S. Pat. No. 6,559,886, the contents of which are hereby incorporated by reference in its entirety.

BACKGROUND OF THE INVENTION

1. Field of the Invention

The present invention relates to a video signal processing method and a video signal processing device each of which is applied to an image-pickup apparatus (e.g., video camera or the like) and performs a predetermined correction process to a luminance signal of a video signal generated by an image pickup operation performed by a solid state image pickup device.

2. Description of Related Art

Conventionally, in a so-called single-plate color video camera using only one sold state image pickup device (charge coupled device: CCD), color filters having different spectral characteristics are arranged on the solid state image pickup device in units of pixels, and signals depending on color components of an object image are obtained from the respective pixels, thereby generating a color video signal. For the video signal generated as described above, color components of the object image are sequentially output according to the arrangement of the color filters, and the color signals are multiplexed. Since the sold state image pickup device can know a specific pixel which a read signal is obtained from, a color signal can be easily separated and demodulated from an output video signal from the solid state image pickup device.

It is an important factor to increase the sensitivity of this single-plate color video camera. Therefore, as color filters employed in the single-plate color video camera, a complementary color filter having transmittance for white light which is higher than that of primary color filters such as R (red), G (green), and B (blue) filters are frequently used.

As the complementary color filter, a filter obtained by arranging Mg (magenta), G (green), Cy (cyan), and Ye (yellow) filters or a filter obtained by arranging W (white), G, Cy, and Ye filters is employed.

In particular, a complementary color filter obtained by arranging W, G, Cy, and Ye filters shown in FIG. 1 is frequently employed in a solid state image pickup device, which is often used in recent years, using a so-called all-pixel reading system in which signal charges of all pixels are independently read for a one-field period and output without mixing them so that high horizontal-and vertical resolutions of an object can be obtained, even if the object is quickly moving.

When the complementary color filter obtained by arranging the W, G, Cy, and Ye shown in FIG. 1 is arranged in a solid state image pickup device which employs the all-pixel reading system as a reading system, a spectral difference may be often generated, as indicated by a hatched portion in FIG. 2, between a luminance signal (Ya=W+G) consisting of W and G and indicated by Ya in FIG. 2 and a luminance signal (Yb=Cy+Ye) consisting of Cy and Ye and indicated by Yb in FIG. 2. It is assumed that the luminance signal Ya is used for a first field and that the luminance signal Yb is used for a second field.

As described above, assume that a spectral difference is generated between the luminance signal Ya consisting of W and G and the luminance signal Yb consisting of Cy and Ye. In this case, thereafter, when the first and second fields are formed by using the luminance signals Ya and Yb later, and an image is displayed on a display device, flickers are generated on the screen of the display device.

Since the spectral difference as described above is caused by a characteristic difference between color filters of a complementary color filter arranged on a solid state image pickup device, it is very difficult (virtually, impossible) to correct the spectral difference by signal processing performed by a circuit arrangement. Therefore, flickers cannot be suppressed.

By the way, the basic processing procedure of a color video camera includes the process of causing a solid state image pickup device to detect an image as charges accumulated in a photoelectric conversion element and the process of causing a low-pass filter to convert a digital signal, obtained by quantizing a quantity of charge, into an analog image signal.

Although a substantial resolution is determined by the number of pixels arranged on a CCD solid state image pickup device, after a sampling process and a restoring process, a false signal caused by an essentially high spatial frequency component is inevitably generated.

FIG. 3 shows an example of a color filter array. Here, a color filter array consisting of W (white), G (green), Cy (cyan), and Ye (yellow) is used, and the four pixels are used as a base unit. In FIG. 3, reference symbol Px denotes a pixel pitch in the horizontal direction, and reference symbol Py denotes a pixel pitch in the vertical direction.

With respect to the horizontal direction, a luminance resolution corresponding a spatial frequency of 1/Px can be expected. However, for example, due to the difference between the intensities of G and Ye, the following false signal is generated when a carrier frequency is represented by fs:

$$(\pi/2) \times (W-G) \sin(2\pi \times fs \times t)$$

SUMMARY OF THE INVENTION

It is an object of the present invention to provide a video signal processing method and a video signal processing device each of which can easily suppress flickers based on the characteristic difference of a complimentary color filter by signal processing performed by a circuit arrangement.

It is another object of the present invention to provide a luminance signal processing circuit for a color video camera which can considerably suppress a false signal generated by luminance signal processing for a color video camera.

To achieve the object described above, from the first aspect of the present invention, there is provided a video signal processing method of processing a luminance signal of a video signal generated by causing a solid state image pickup device to receive light transmitted through color filters, comprising the steps of: calculating an output signal from a specific pixel of the solid state image pickup device; calculating an average of output signals from all pixels of the solid state image pickup device; generating a control signal by a predetermined arithmetic operation using the output signal from the specific pixel and the average of the output signals from all the pixels of the solid state image pickup device; and performing a predetermined correction process to the luminance signal by using the control signal.

Further, from the second aspect of the present invention, there is provided a video signal processing method of processing a luminance signal of a video signal generated by causing a solid state image pickup device to receive light transmitted through color filters, comprising the steps of: calculating an output signal from a first specific pixel of a solid state image pickup device; calculating an output signal from a second specific pixel of the solid state image pickup device; generating a control signal by a predetermined arithmetic operation using the output signal from the first specific pixel and the output signal from the second specific pixel of the solid state image pickup device; and performing a predetermined correction process to a luminance signal by using the control signal.

Further, from the third aspect of the present invention, there is provided a video signal processing device for processing a luminance signal of a video signal generated by causing a solid state image pickup device to receive light transmitted through color filters, comprising: first signal operation means for calculating an output signal from a specific pixel of the solid state image pickup device; second signal operation means for calculating an average of output signals from all pixels of the solid state image pickup device; control signal generation means for generating a control signal by a predetermined arithmetic operation using the output signal from the specific pixel and the average of the output signals from all the pixels of the solid state image pickup device; and correction means for performing a predetermined correction process to the luminance signal by using the control signal.

Further, from the fourth aspect of the present invention, there is provided a video signal processing device for processing a luminance signal of a video signal generated by causing a solid state image pickup device to receive light transmitted through color filters, comprising: first signal operation means for calculating an output signal from a first specific pixel of a solid state image pickup device; second signal operation means for calculating an output signal from a second specific pixel of the solid state image pickup device; control signal generation means for generating a control signal by a predetermined arithmetic operation using the output signal from the first specific pixel and the output signal from the second specific pixel of the solid state image pickup device; and correction means for performing a predetermined correction process to a luminance signal by using the control signal.

In the video signal processing method and the video signal processing device, the predetermined arithmetic operation is performed by using the output signal from the specific pixel of the solid state image pickup device and the output signals (or output signal from another specific pixel) of all the pixels, so that the control signal having a value corresponding to a characteristic difference of color filters is generated. Therefore, when a correction process is performed to a video signal by using the control signal, the characteristic difference of the color filters can be suppressed. As a result, flickers can be suppressed from being generated.

Further, from the fifth aspect of the present invention, there is provided a luminance signal processing circuit for a color video camera, generating a luminance signal from an output signal from a solid state image pickup device having a plurality of lines obtained by repeating a pair of pixels having color filters, the luminance signal processing circuit comprising: a circuit in which a light transmittance of one of the pair of pixels and a light transmittance of the other are represented by T1 and T2, respectively, a photo detection signal from one of the pair of pixels is multiplied by $(T1+T2)/(2 \times T1)$ in advance, a photo detection signal from the other of the pair of pixels is multiplied by $(T1+T2)/(2 \times T2)$, and the luminance signal is generated by a low-frequency component of a signal obtained by synthesizing these photo detection signals.

Preferably, the solid state image pickup device may be a CCD solid state image pickup device. A combination of the color filters of the pair of pixels may be a combination having a small variation in color temperature. In addition, the combination of the color filters may be a combination of a filter having a transparent spectrum or an almost transparent spectrum and a green filter. Furthermore, the combination of the color filters may be a combination of a magenta filter and a green filter.

Furthermore, from the sixth aspect of the present invention, there is provided a luminance signal processing circuit for a color video camera, generating a luminance signal from an output signal from a solid state image pickup device having a plurality of lines obtained by repeating a pair of pixels having color filters, the luminance signal processing circuit comprising: a circuit in which an output signal from one of the pair of pixels and an output signal from the other are represented by T1 and T2, respectively, low-frequency components of the output signals T1 and T2 are represented by T1L and T2L, respectively, and conversions expressed by the following equations:

$$T1'=T1 \times (T1L+T2L)/(2 \times T2L)$$

$$T2'=T2 \times (T1L+T2L)/(2 \times T1L)$$

are performed to the pixels of the respective lines to generate the luminance signal.

Further, from the seventh aspect of the present invention, there is provided a luminance signal processing circuit for a color video camera, generating a luminance signal from an output signal from a solid state image pickup device having a plurality of lines obtained by repeating a pair of pixels having color filters, the luminance signal processing circuit comprising: a circuit in which an output signal from one of the pair of pixels and an output signal from the other are represented by T1 and T2, respectively, low-frequency components of the output signals T1 and T2 are represented by T1L and T2L, respectively, and conversions expressed by the following equations:

$$T1'=2 \times T1 \times T2L/(T1L+T2L)$$

$$T2'=2 \times T2 \times T1L/(T1L+T2L)$$

are performed to the pixels of the respective lines to generate the luminance signal.

Preferably, the solid state image pickup device may be a CCD solid state image pickup device. The combination of the color filters may be a combination of a filter having a transparent spectrum or an almost transparent spectrum and a green filter. In addition, the combination of the color filters may be a combination of a magenta filter and a green filter.

DETAILED DESCRIPTION OF THE PREFERRED EMBODIMENTS

Preferred embodiments of a video signal processing method and a video signal processing device according to the present invention will be described below with reference to the accompanying drawings.

First Embodiment

A video signal processing method and a video signal processing device according to the first embodiment of the present invention can be applied to a video camera in which a video signal picked up by, e.g., a solid state image pickup device (charge coupled device: CCD) is recorded on a tape-like recording medium such as a magnetic tape, a disk-like recording medium such as a magnetic disk or an optical disk, or a semiconductor memory or a removable semiconductor memory card arranged in the device.

A solid state image pickup device used in a video camera according to this embodiment employs a solid state image pickup device using a so-called all-pixel reading system which independently reads signal charges of all the pixels in a field period and outputs the signal charges without mixing them so that high horizontal and vertical resolutions of an object can be obtained, even if the object is quickly moving. In addition, in this embodiment, in order to reduce the size of the device arrangement and costs, this solid state image pickup device is of a single-plate type. In order to realize a sensitivity higher than that of a primary color filter, on the light-receiving surface of the solid state image pickup device, W (white), G (green), Cy (cyan), and Ye (yellow) complementary color filters having different spectral characteristics are arranged in correspondence with pixels.

Figure 4:
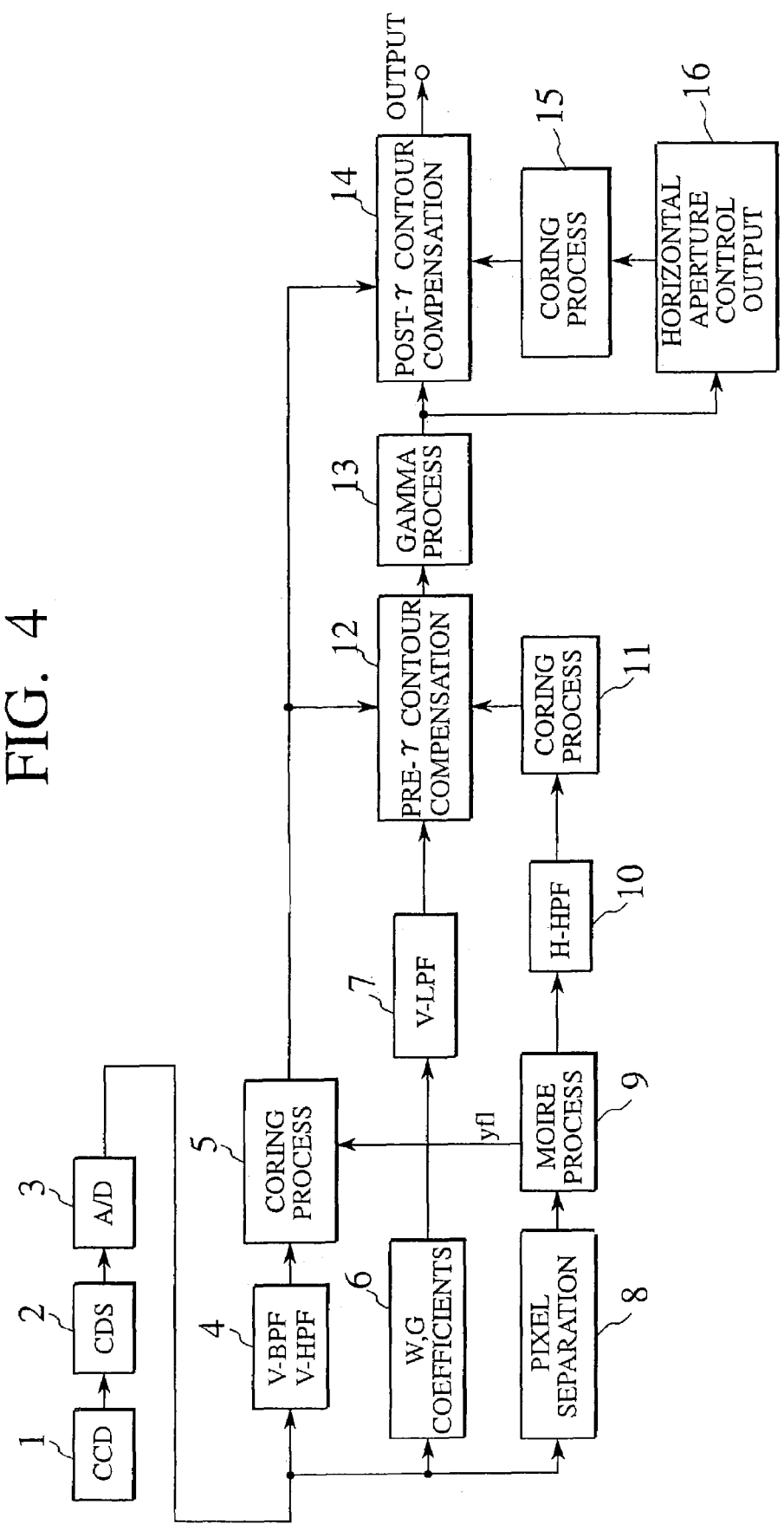
FIG. 4 is a block diagram showing the arrangement of a main part of a video camera according to the first embodiment to which a video signal processing method and a video signal processing device according to the present invention are applied.

The arrangement of a main part of a video camera according to the first embodiment of the present invention is shown in FIG. 4. Referring to FIG. 4, for a simple illustration, a lens optical system, a recording system for a recording medium, various signal processing systems, an operation system, and the like which are generally provided in a video camera will be omitted.

In FIG. 4, light which is emitted from an object or the like comes through a lens optical system (not shown) and complementary color filters to form an image on a solid state image pickup device (to be referred to as a CCD 1 hereinafter). In the CCD 1, the incident light is subjected to photoelectric conversion, and an obtained imaging signal is supplied to a correlated double sampling circuit (CDS) 2.

This correlated double sampling circuit 2 is a circuit for performing a so-called correlated double sampling process which is a noise reduction method of removing random noise (shot noise of a signal and a dark current) of the CCD 1. More specifically, a process of suppressing reset noise by subtracting the level of a field through period from a signal period level. An output from the correlated double sampling circuit 2 is supplied to an analog/digital (A/D) converter 3.

The analog/digital converter 3 includes a sample holding circuit on the input side and samples an analog imaging signal sample-held by the sample holding circuit at a predetermined sampling frequency to convert the analog imaging signal into a digital signal (to be referred to as a digital video signal hereinafter). The digital video signal output from the analog/digital converter 3 is supplied to a vertical filter circuit 4, a main signal processing circuit 6, and a pixel separation circuit 8.

The vertical filter circuit 4 has, at least, a vertical band-pass filter (V-BPF) for extracting a predetermined frequency band component in the vertical direction from the digital video signal and a vertical high-pass band filter (V-HPF) for extracting a high-frequency band component in the vertical direction from the digital video signal. The vertical filter circuit 4 extracts a frame component in the vertical direction from the digital video signal. The vertical band-pass filter and the vertical high-pass filter are infinite impulse response (IIR) digital filters or finite impulse response (FIR) digital filters. For example, a five-tap filter coefficient is set for the vertical high-pass filter, and a three-tap filter coefficient is set for the vertical band-pass filter. An output signal from the vertical filter circuit 4, i.e., a contour component in the vertical direction extracted from the digital video signal is supplied to a coring process circuit 5.

Figure 1:
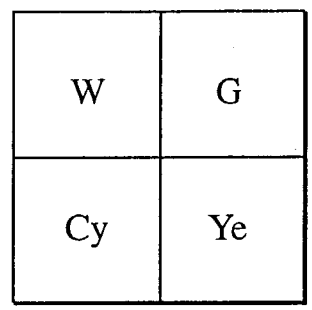
FIG. 1 is a view showing an example of the arrangement of a complementary color filter of a CCD solid state image pickup device of a color video camera.
Figure 2:
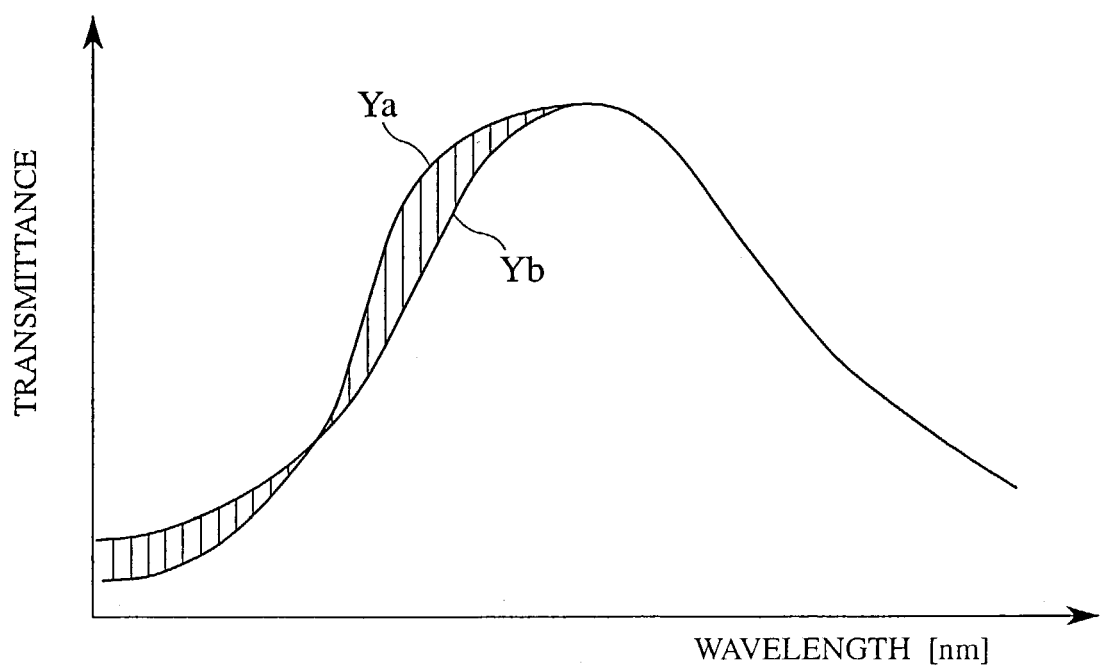
FIG. 2 is a graph used for explaining the cause of generation of flickers.

The coring process circuit 5 performs a so-called coring process which suppresses a noise component included in the contour component of an image to improve a signal/noise ratio (S/N). At the same time, in the coring process circuit 5, due to the characteristic difference between complementary color filters of W, G, Cy, and Ye as shown in FIG. 1, a spectral difference (luminance difference) generated between a luminance signal (Ya=W+G) consisting of W and G and a luminance signal (Yb=Cy+Ye) consisting of Cy and Ye is suppressed by controlling a coring correction amount in the coring process. As a result, a correction process for suppressing flickers is also performed.

The correction process for suppressing flickers in the coring process circuit 5 will be described below.

Figure 5:
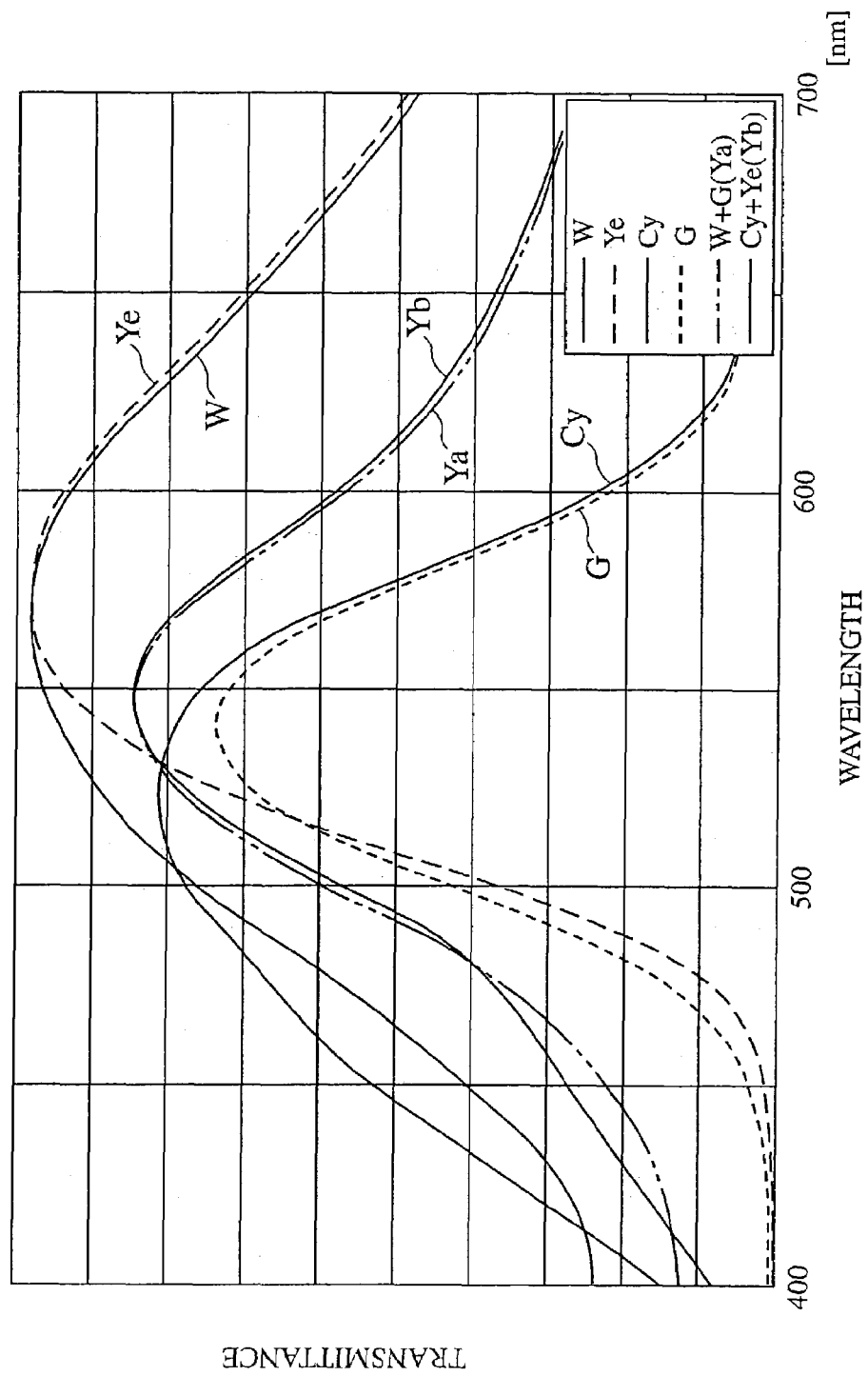
FIG. 5 is a graph for explaining the relationship between the transmittances and wavelengths of complementary signals and luminance signals obtained by a complementary filter.
Figure 6:
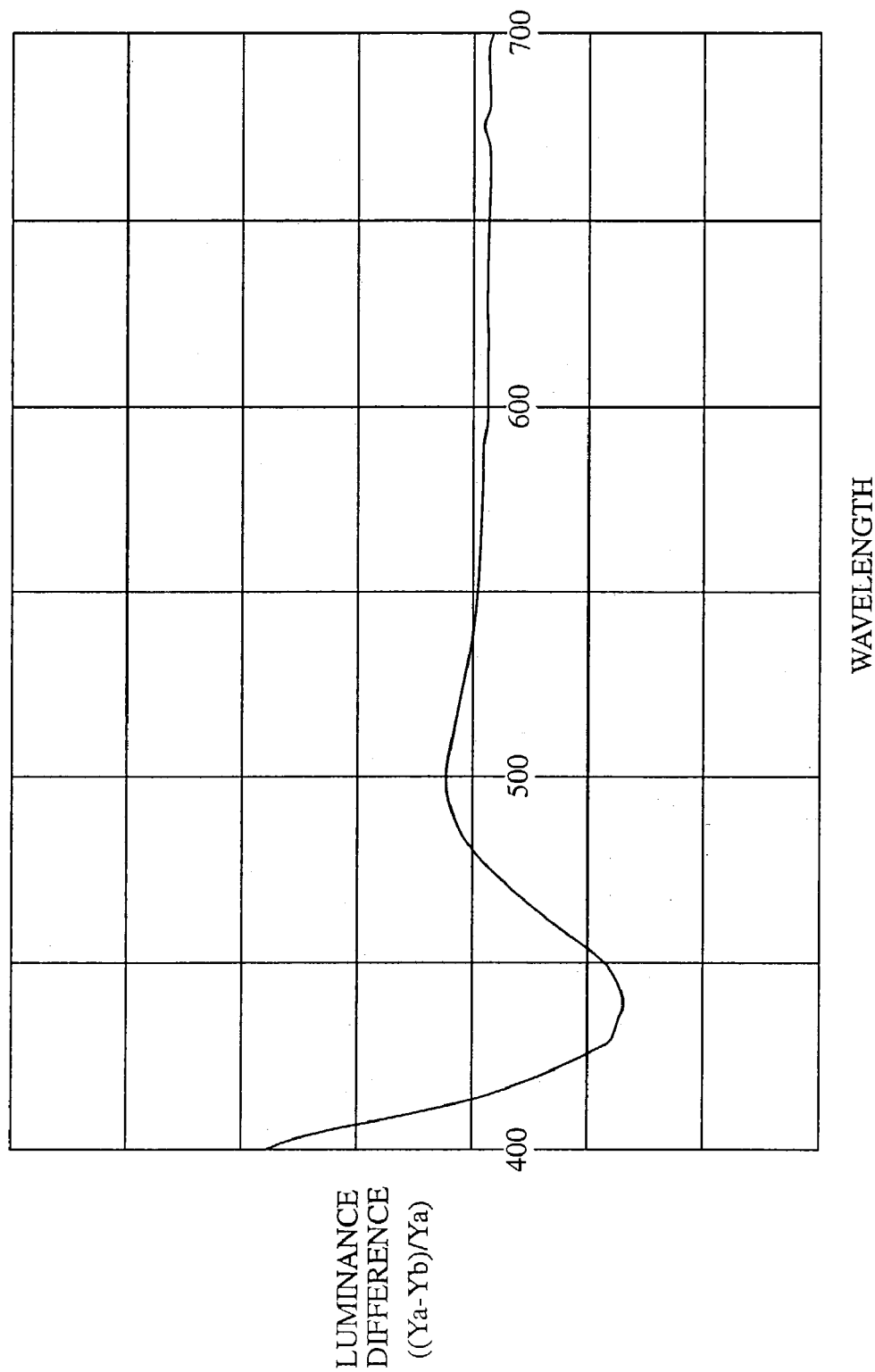
FIG. 6 is a graph showing used for explaining a luminance difference.

In the complementary color filters of W, G, Cy, and Ye shown in FIG. 1, the respective color filters have the relationship between a light transmittance and a waveform as shown in FIG. 5. It is understood from FIG. 5 that the color filter has a high transmittance on a short-wavelength side. It is also understood from FIG. 5 that a luminance Y (Ya, Yb) is spectrum having a wavelength centered at about 550 nm. Here, when the following equations are satisfied:

$$Ya=W+G$$

$$Yb=Cy+Ye,$$

it is understood that Ys (luminance difference)=(Ya−Yb)/Ya is large on the short-wavelength side as shown in FIG. 6.

Therefore, the following may be understood. That is, when a control signal having a correction value (coring correction value) which increases on the short-wavelength side with respect to a luminance signal is supplied to the coring process circuit 5, flickers can be suppressed. As shown in FIG. 5, a color signal of Cy having a high transmittance on the short-wavelength side may be used. However, when the color signal of Cy is directly used as a control signal for the correction amount in the coring process circuit 5, the control signal is not appropriate because the control signal has the maximum correction amount obtained at a wavelength of about 500 nm.

Figure 7:
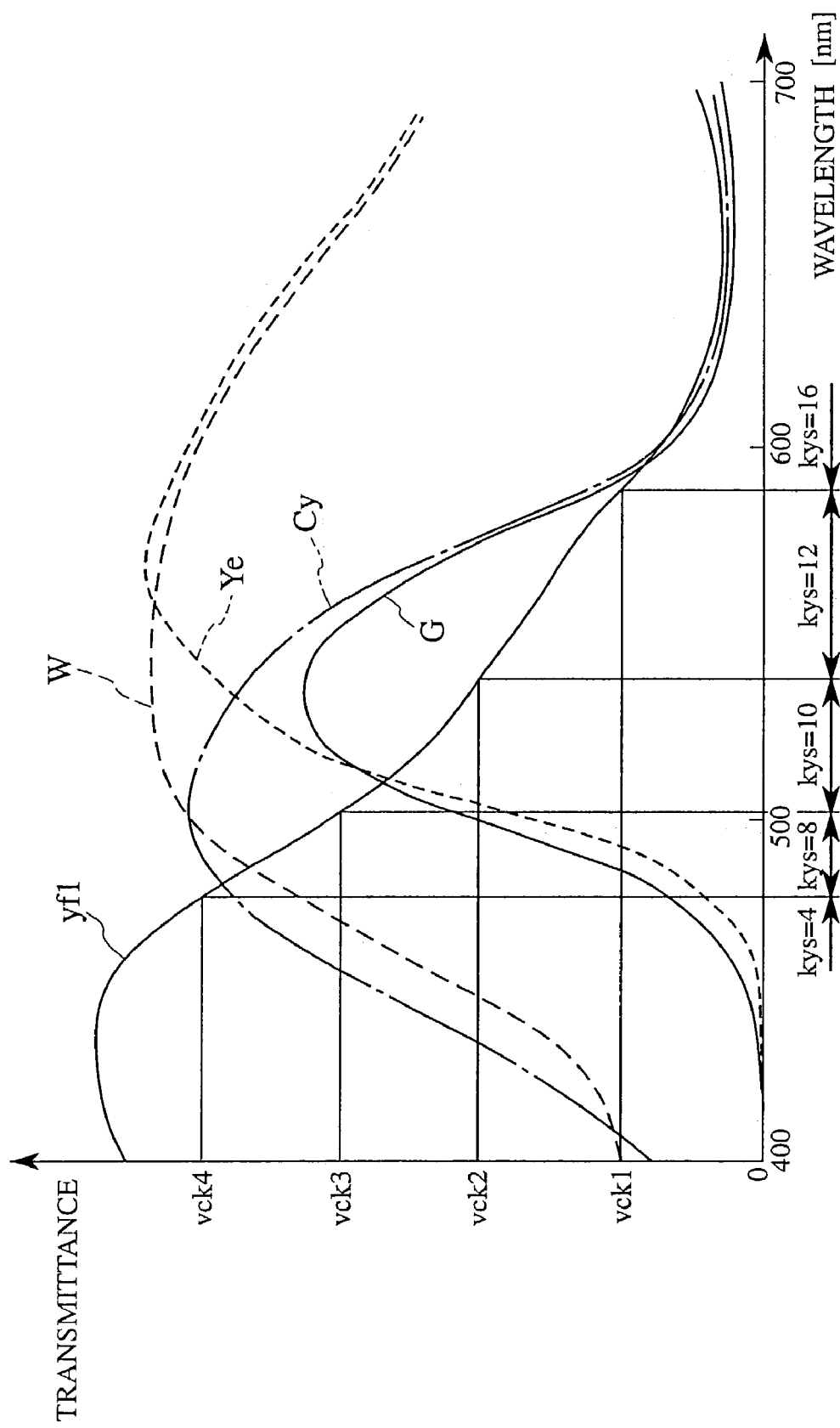
FIG. 7 is a graph used for explaining complementary color signals and a control signal for controlling a correction amount of a coring process.

In contrast to this, it is understood that a signal obtained by calculating, e.g., Cy/Y is a signal having a value which increases as the wavelength decreases as shown in FIG. 7. Therefore, according to this embodiment, the signal obtained by calculating Cy/Y is supplied to the coring process circuit 5 as a control signal yf1 having a correction value which increases on the short-wavelength side with respect to the luminance signal. In this embodiment, the control signal yf1 is generated by a moire process circuit 9 (to be described later) to be supplied to the coring process circuit 5. In FIG. 7, for comparison with the control signal yf1 obtained by calculating Cy/Y, the characteristics of complementary color signals of W, Ye, Cy, and G are also shown.

More specifically, in the coring process circuit 5, the control signal yf1 obtained by calculating Cy/Y and supplied from the moire process circuit 9 is classified by five stages (vck1, vck2, vck3, and vck4) according to the transmittance as shown in FIG. 7. On the long-wavelength side, a correction amount (coring correction amount) in the coring process circuit 5 is decreased; and on the short-wavelength side, a correction amount (coring correction amount) in the coring process circuit 5 is increased. As a result, the coring correction amount is increased for a video signal from an object including a large amount of short-wavelength component having a large luminance difference (Ys=(Ya−Yb)/Ya) shown in FIG. 6, and the luminance difference can be compressed. On the other hand, the coring correction amount decreases on the long-wavelength side (or correction is not performed), so that image quality can be prevented from being degraded.

Figures 8, 9:
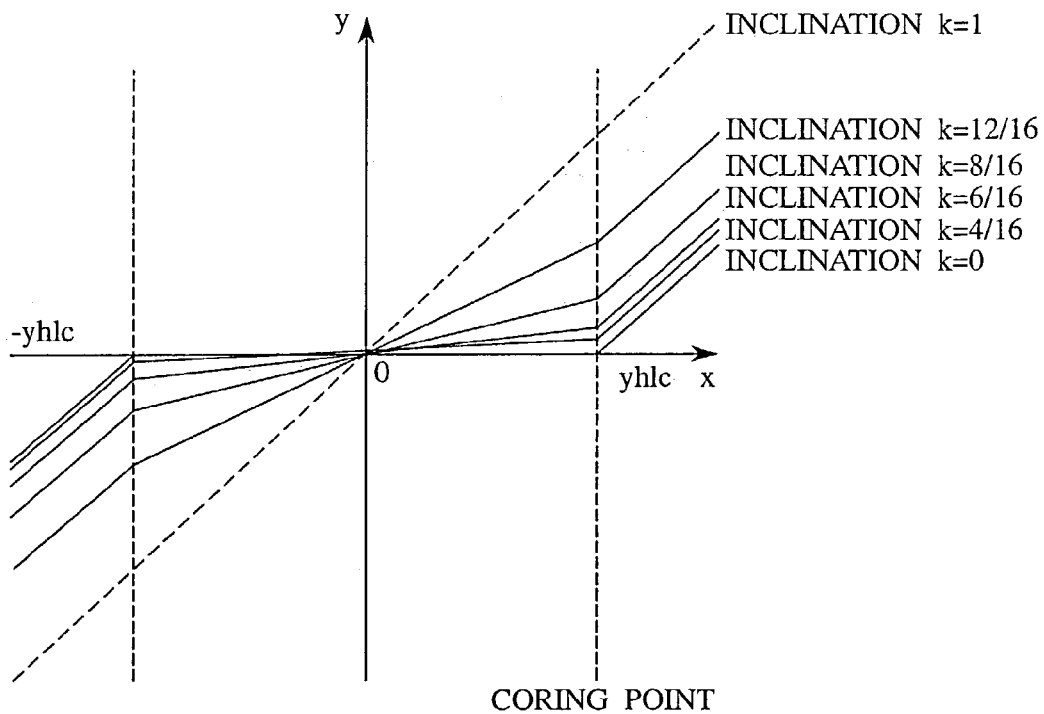
FIG. 8 is a graph showing the relationship between inclinations based on a coring coefficient and a coring point in the coring process.
FIG. 9 is a table showing the correspondence between a control signal, a coring range, and a coring coefficient.

In the coring process circuit 5, in order to realize correction amount control (control of a coring correction amount) for the luminance signal, a microcomputer sets inclinations k=1, k=12/16, k=8/16, k=6/16, k=4/16, k=0, and the like based on a coring coefficient kys as shown in FIG. 8, coring points yh1c and −yh1c, and a corresponding table or the like between a coring range shown in FIG. 9 and the coring coefficient kys, so that coring coefficients (inclinations, i.e., coring correction amounts) are selectively switched by the control signal yf1 to be set. The range subjected to coring is set as a coring point by the microcomputer.

In this embodiment, the coring range can be switched depending on an arithmetic operation method (a=0, b=1) of a moire process in the moire process circuit 9 (to be described later). For example, as shown in FIG. 9, a coring range used when the moire process is a (=0, a→y+1=CyL/YL) is given such that the coring coefficient kys=16 when vck1≦yf1 is satisfied; the coring coefficient kys=12 when vck2≦yf1<vck1 is satisfied; the coring coefficient kys=10 when vck3≦yf1<vck2 is satisfied; the coring coefficient kys=8 when vck4≦yf1<vck3 is satisfied; and the coring coefficient kys=4 when 0≦yf1<vck4. On the other hand, a coring range used when the moire process is b(=0, b→y+1=YL/CyL) is given such that the coring coefficient kys=4 when vck1≦yf1 is satisfied; the coring coefficient kys=8 when vck2≦yf1<vck1 is satisfied; the coring coefficient kys=10 when vck3£yf1<vck2 is satisfied; the coring coefficient kys=12 when vck4≦yf1<vck3 is satisfied; and the coring coefficient kys=16 when 0≦yf1<vck4. As a matter of course, independently of the method of the moire process, the coring correction amount may be controlled.

In this embodiment, although the signal obtained by calculating Cy/Y is defined as the control signal yf1, a signal obtained by calculating Cy/Y1 (Y1 is the low-frequency component of a Y signal) is also defined as the control signal yf1, and a signal obtained by calculating Cy1/Y1 (Cy1 is the low-frequency component of a Cy signal) is also defined as the control signal yf1. Similarly, a signal generated by using an operation expression such as Cy1/Ye1 (Ye1 is the low-frequency component of a Ye signal) or Y1/Ye1 can also be defined as the control signal yf1. When the operation expression such as Cy1/Ye1 or Y1/Ye1 is used, a correction amount on the short-wavelength side can be controlled. When the inverse of the operation expression is used, a correction amount on the long-wavelength side can also be controlled.

Returning to FIG. 4, a signal subjected to the coring process by the coring process circuit 5 is supplied to a pre-γ (gamma) contour compensation circuit 12 and a post-γ contour compensation circuit 14 (to be described later).

The main signal processing circuit 6 multiplies predetermined pixel coefficients kw and kg by W and G in the complementary signals of W (white), G (green), Cy (cyan), and Ye (yellow) to suppress moire caused by WG. A timing at which the pixel coefficients kw and kg by W and G is designed to be switched depending on the array of the color filters. A digital video signal (to be referred to as a main signal hereinafter) output from the main signal processing circuit 6 is supplied to a vertical low-pass filter (V-LPF) 7.

Since the vertical low-pass filter 7 adds a contour component, i.e., a high-frequency component, to a main signal in the pre-γ contour compensation circuit 12 of the post stage, high-frequency components in the horizontal and vertical directions are removed from the main signal as the previous process. The vertical low-pass filter 7 is a finite or infinite impulse response digital filter. For example, a five-tap filter coefficient is set for the vertical low-pass filter 7. The main signal from which the high-frequency component is removed by the vertical low-pass filter 7 is supplied to the pre-γ contour compensation circuit 12.

Since digital video signals supplied from the analog/digital converter 3 are signals which are sequentially supplied according to the array of complementary color filters of W, G, Cy, and Ye, the pixel separation circuit 8 separates the sequentially supplied signals from signals from pixels corresponding to W, G, Cy, and Ye. In the pixel separation circuit 8, in order to interpolate portions corresponding pixels removed by the pixel separation (to arrange complementary color signals at portions corresponding to the removed pixels), pixel interpolation in, e.g., the horizontal direction may also be performed. The signals output from the pixel separation circuit 8 are supplied to the moire process circuit 9.

The moire process circuit 9 balances the levels of the complementary color signals of W, G, Cy, and Ye supplied from the pixel separation circuit 8 to perform a moire process for suppressing moire. An output signal from the moire process circuit 9 is supplied to a horizontal high-pass filter (H-HPF) 10. The above-described control signal yf1 used in the coring process circuit 5 is also output from the moire process circuit 9.

In the horizontal high-pass filter 10, a high-frequency band component is extracted from a supplied signal. More specifically, a horizontal high-frequency component subjected to a moire process is output from the horizontal high-pass filter 10. An output signal from the horizontal high-pass filter 10 is supplied to a coring process circuit 11.

The coring process circuit 11 has almost the same arrangement as that of the coring process circuit 5. The coring process circuit 11 suppresses a noise component included in the high-frequency component of the signal supplied from the horizontal high-pass filter 10 to perform a coring process for improving a signal/noise (S/N) ratio. The horizontal high-frequency component subjected to the moire process and subjected to the coring process by the coring process circuit 11 is supplied to the pre-γ contour compensation circuit 12.

The pre-γ contour compensation circuit 12 mixes a horizontal contour component obtained by the vertical filter circuit 4 and the coring process circuit 5, the main signal which is obtained by the main signal processing circuit 6 and the vertical low-pass filter 7 and from which a high-frequency component is removed, and the horizontal high-frequency component which is obtained by the arrangement extending from the pixel separation circuit 8 to the coring process circuit 11 and which is subjected to the moire process and the coring process to each other to constitute a luminance signal and to compensate for the contour of the luminance signal. A video signal subjected to contour compensation by the pre-γ contour compensation circuit 12 is supplied to a gamma process circuit 13.

The gamma process circuit 13 performs a γ-(gamma-) correction process, for correcting the gamma characteristics of a CRT (cathode ray tube) to be used as a display device, to a digital video signal supplied from the pre-γ contour compensation circuit 12. The video signal subjected to the gamma correction process by the gamma process circuit 13 is supplied to a post-γ contour compensation circuit 14 and a horizontal aperture-control circuit 16.

In the horizontal aperture-control circuit 16 performs a horizontal (or vertical) aperture correction to the video signal subjected to the gamma correction process by the gamma process circuit 13 to the video signal subjected to the aperture correction to a coring process circuit 15.

The coring process circuit 15 also has almost the same arrangement as that of the coring process circuit 11 or the coring process circuit 5 and suppresses noise component included in the high-frequency band component of the video signal to perform a coring process for improving a signal/noise (S/N) ratio. An output signal from the coring process circuit 15 is supplied to the post-γ contour compensation circuit 14.

The post-γ contour compensation circuit 14 mixes a vertical contour component obtained by the vertical filter circuit 4 and the coring process circuit 5, a video signal subjected to the gamma correction process and output from the gamma process circuit 13, and the signal subjected to horizontal aperture correction to each other to compensate for the contour of a luminance signal subjected to the gamma correction process.

An output signal from the post-γ contour compensation circuit 14 is output as a digital video signal of the video camera of this embodiment or recorded on a recording medium.

As described above, in the video camera of this embodiment, the moire process circuit 9 generates the control signal yf1 by calculating, e.g., Cy/Y, and the coring process circuit 5 control a coring correction amount on the basis of the control signal yf1. More specifically, the coring process circuit 5 performs the coring process such that a correction amount of the coring process is decreased (or the coring process is not performed) on the long-wavelength side and is increased on the short-wavelength side. A luminance difference is compressed with respect to a video signal from an object including a large amount of short-wavelength component having a large luminance difference. On the other hand, image quality can be prevented from being degraded on the long-wavelength side. As a result, in the video camera of this embodiment, flickers caused by the characteristic difference between complementary color filters can be suppressed.

In the vertical filter circuit 4 having the arrangement shown in FIG. 4, the filter coefficients of the vertical band-pass filter and the vertical high-pass filter are set at predetermined values. However, the filter coefficient of the vertical band-pass filter may be set at a predetermined value, and the rate of the vertical high-pass filter may be switched. A switch used at this time may be designed to be controlled by an external circuit.

Immediately after the coring process circuit 5, a switching circuit which mixes signals of two lines through a line memory if an output signal from the coring process circuit 5 is saturated or directly outputs the signals if the output signal is not saturated may also be arranged. In this case, saturation data from the CCD 1 is supplied to the switching circuit, and a gain coefficient for gain control set by the microcomputer is input to the switching circuit. If it is detected from the saturation data that the output signal from the coring process circuit 5 is saturated, signals of two lines are mixed to each other through, e.g., a line memory. If the output signal is not saturated, a switching output is performed to directly output the signals, and the switching output is multiplied by the gain coefficient. Control of the switching output in the switching circuit can also be performed by a switching change-over signal, and a mixture signal of the two lines obtained through the line memory can also be always output. When the switching circuit is arranged, the output signal from the switching circuit is supplied to the pre-γ contour compensation circuit 12 and the post-γ contour compensation circuit 14.

In addition, in order to improve a signal/noise (S/N) ratio, horizontal low-pass filters can also be arranged between the vertical filter circuit 4 and the coring process circuit 5 and between the vertical low-pass filter 7 and the pre-γ contour compensation circuit 12, respectively.

In the gamma process circuit 13, the above process and the a knee process can also be performed at the same time.

Second Embodiment

Figure 12:
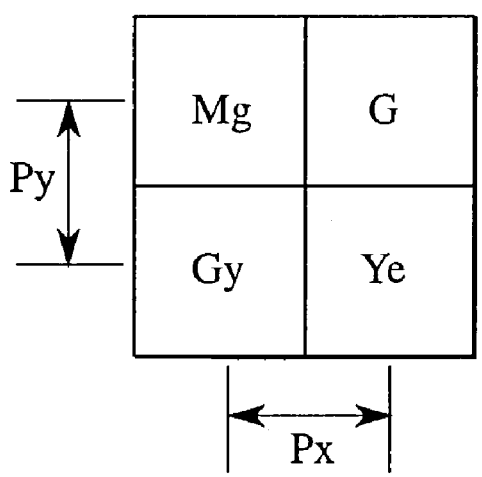
FIG. 12 is a view showing another example of a color filter array used in the CCD solid state image pickup device of the color video camera according to the second and third embodiments of the present invention.
Figure 10:
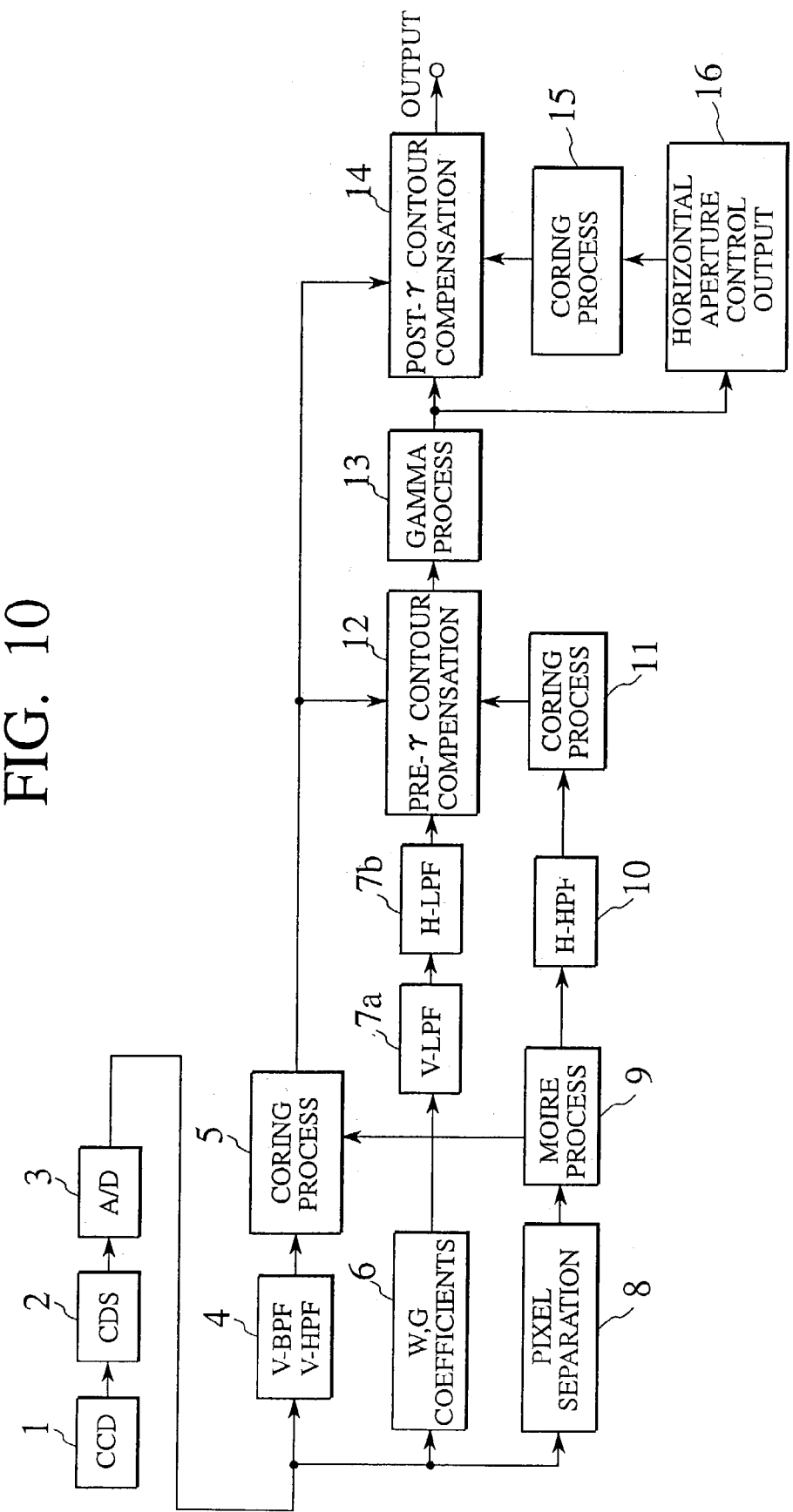
FIG. 10 is a block diagram of a system using a luminance signal processing circuit for a color video camera according to the second embodiment of the present invention.

The second embodiment of the present invention will be described below with reference to FIGS. 10 to 12. FIG. 10 is a view showing the arrangement of the outline of the embodiment in which the present invention is applied to a color video camera. The same reference numerals as in FIG. 4 denote the same parts in FIG. 10, and an overlapping description will be omitted.

In this embodiment, as will be described later, a digital signal (to be referred to as a main signal hereinafter) from which a false signal is removed by a main signal processing circuit 6 is sequentially supplied to a vertical low-pass filter (V-LPF) 7a and a horizontal low-pass filter (H-LPF) 7b.

Since the vertical low-pass filter (V-LPF) 7a and the horizontal low-pass filter (H-LPF) 7b add a contour component, i.e., a high-frequency component to a main signal in a pre-γ contour compensation circuit 12 of the post stage, a high-frequency component is removed from the main signal as the previous process. The vertical low-pass filter 7a is a finite or infinite impulse response digital filter. For example, a five-tap filter coefficient is set for the vertical low-pass filter 7a. The main signal from which the high-frequency component is removed by the vertical low-pass filter 7a and the horizontal low-pass filter 7b is supplied to the pre-γ contour compensation circuit 12.

The pre-γ contour compensation circuit 12 mixes a vertical contour component obtained by a vertical filter circuit 4 and a coring process circuit 5, the main signal which is obtained by a main signal processing circuit 6 and the vertical low-pass filter 7a and the horizontal low-pass filter 7b and from which a high-frequency component is removed, and the horizontal high-frequency component which is obtained by the arrangement extending from a pixel separation circuit 8 to a coring process circuit 11 and which is subjected to a moire process and a coring process to each other to constitute a luminance signal and to compensate for the contour of the luminance signal. A video signal subjected to contour compensation by the pre-γ contour compensation circuit 12 is supplied to a gamma process circuit 13.

The process in the main signal processing circuit 6 serving as a main part of this embodiment will be described below.

Figure 3:
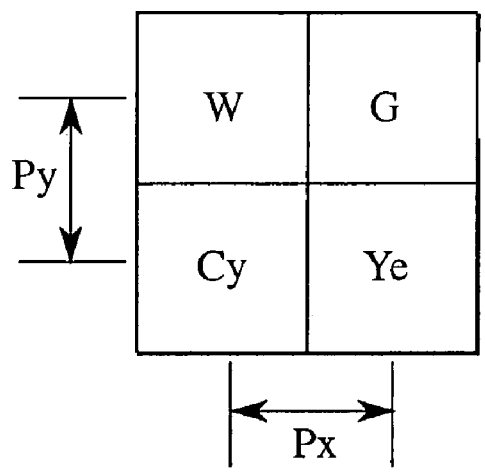
FIG. 3 is a view showing an example of color filters of a CCD solid state image pickup device of a color video camera.

As the color filter array of a CCD 1 used in this camera, a color filter array having four pixels of W, G, Cy, and Ye as one unit isused, as shown in FIG. 3. In FIG. 3, reference symbol Px denotes a pixel pitch in the horizontal direction, and reference symbol Py denotes a pixel pitch in the vertical direction.

Figure 11:
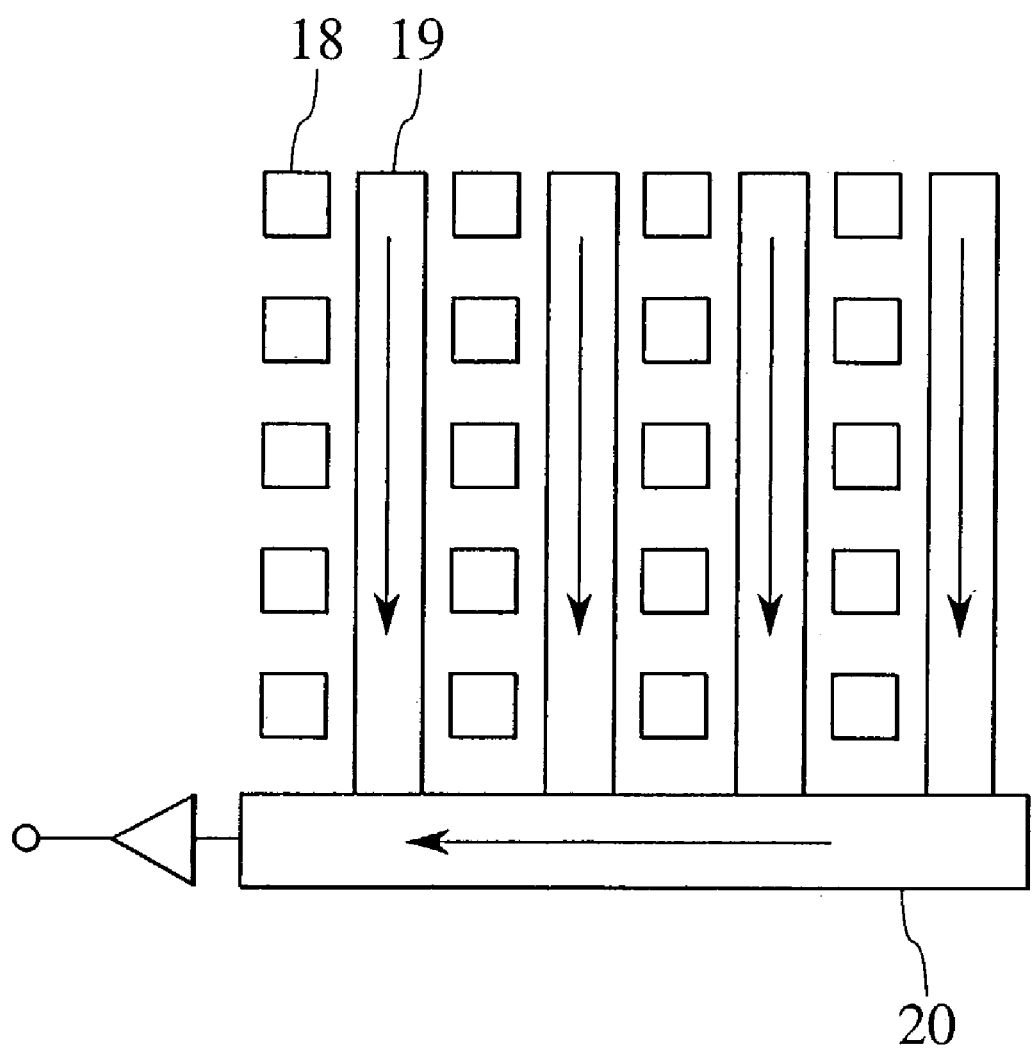
FIG. 11 is a view for explaining a transfer of charges in a CCD solid state image pickup device of a color video camera having a luminance signal processing circuit for a color video camera according to the second and third embodiments of the present invention.

In the CCD 1, as shown in FIG. 11, charges of all pixels accumulated in a photoelectric conversion element 18 are transferred to a vertical CCD 19 to be read by a horizontal CCD 20 in units of lines. An interleave system which reads signals every other line, a system which uses two horizontal CCDs, and the like are known. If any system is used, the same process as described above can be performed.

Therefore, a signal having a series of W, G, W, G, . . . and a signal having a series of Cy, Ye, Cy, Ye, . . . can be obtained. In this embodiment, a conversion process is performed to the signal having the WG series.

With respect to the horizontal direction, a luminance resolution corresponding a spatial frequency of 1/Px can be generally expected. However, when a signal S having the WG series passes through a low-pass filter, the signal S includes a false signal due to the difference between a W signal and a G signal in intensity. When a carrier frequency is represented by fs, the signal S is given by:

$$S=(W+G)/2+(\pi/2)\times(W-G)\sin(2\pi \times fs \times t) \qquad (1)$$

Here, the first term is an original luminance signal, and the second term is a false signal. On the other hand, the difference between the W signal and the G signal in intensity is largely dependent on a difference between color filters in light transmittance. Therefore, conversions given by the following equations are performed:

$$Kw=(Tw+Tg)/2Tw$$

$$Kg=(Tw+Tg)/2Tg$$

$$W'=Kw \times W$$

$$G'=Kg \times G$$

The conversions are performed such that a digital video signal supplied from the analog/digital converter 3 is multiplied by predetermined constants Kw and Kg, and are performed by a multiplier arranged in the main signal processing circuit 6.

Here, reference symbol Tw denotes the light transmittance of a W pixel, and Tg denotes the light transmittance of a G pixel. In this case, since the W pixel basically transmits all incident light, no color filter does not substantially exist. More specifically, the color filter of the W pixel has a transparent spectrum or an almost transparent spectrum.

However, for descriptive convenience, the light transmittance of the color filter of the W pixel is defined as a light transmittance equal to that of a general color filter. More specifically, the light transmittance of the W pixel is generally considered as 1. In this case, when flat white light is incident on the W pixel, the following relationships are satisfied:

$$W'+G'=Kw \times W+Kg \times G$$

$$Kw \times W'=Kg \times G'$$

In this manner, W and G are converted into W' and G', respectively. When W' and G' are substituted in Equation (1), a signal S' being free from a false signal is obtained in the following manner:

$$S' = (W' + G')/2 + (\pi/2) \times (W' - G')\sin(2\pi \times fs \times t)$$

$$= (W + G)/2$$

In general, since (W'−G') is compressed more greatly than (W−G), it is understood that the false signal is reduced.

In this manner, the low-pass filters 7a and 7b removes a predetermined high-band component from a signal whose false signal is reduced in the main signal processing circuit 6 to generate a luminance signal.

Even in a filter other than the W and G filters, when the filter is slightly influenced by a color temperature like the W and G filters, the filter rarely depends on the spectrum of incident light. For this reason, the above conversions are effective. For example, even in a CCD solid state image pickup device having a color array including four pixels of Mg (magenta), G (green), Cy (cyan), and Ye (yellow) as one unit, the same process as described above is effective. In this case, conversion processes are given by the following equations:

$$Km = (Tm + Tg)/2Tm$$

$$Kg = (Tm + Tg)/2Tg$$

$$Mg' = Km \times Mg$$

$$G' = Kg \times G$$

Here, reference symbol Tm denotes the light transmittance of the Mg pixel, and Tg denotes the light transmittance of the G pixel.

Third Embodiment

Figure 13:
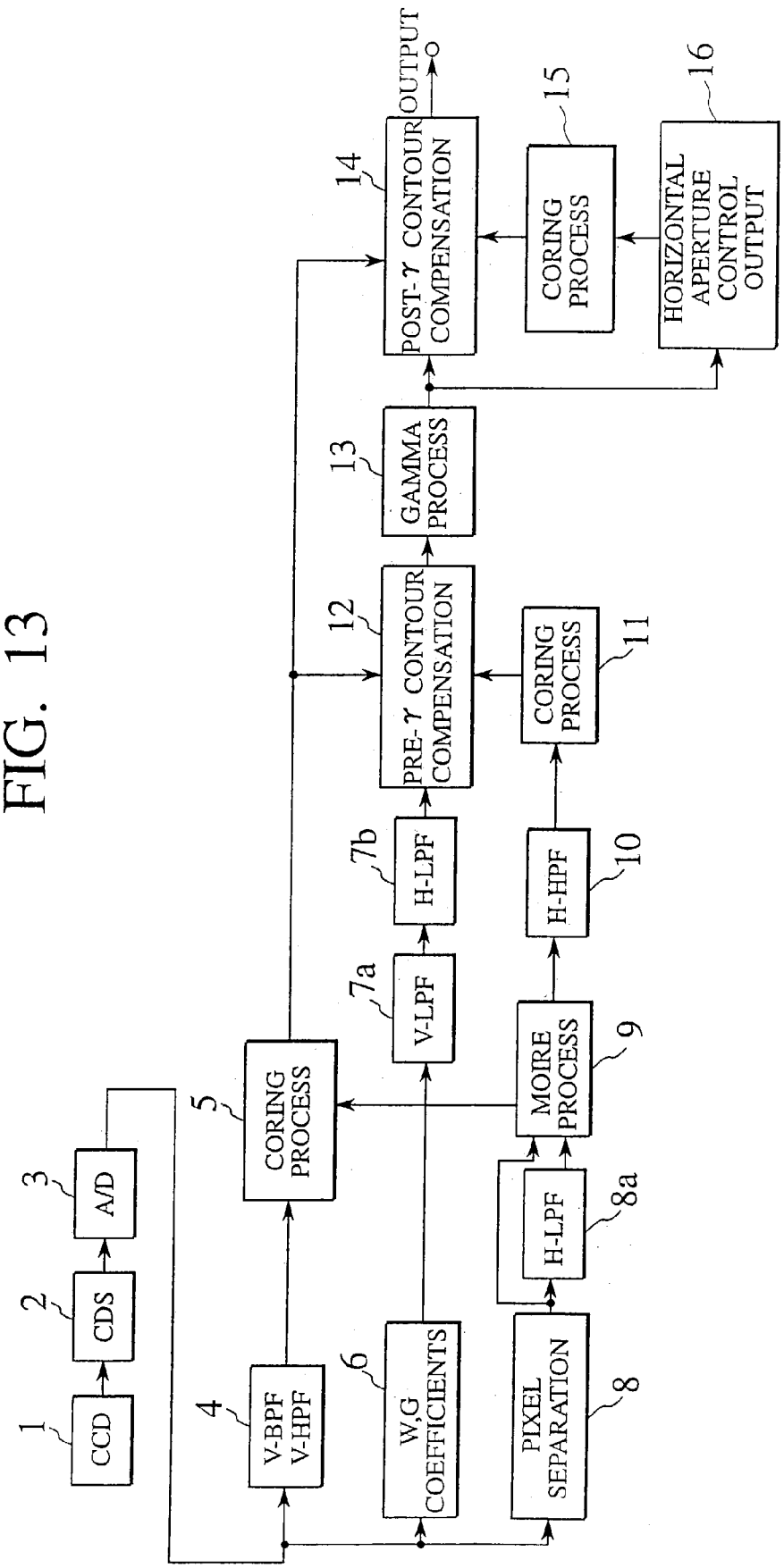
FIG. 13 is a block diagram of a system using a luminance signal processing circuit for the color video camera according to the third embodiment of the present invention.

The third embodiment of the present invention will be described below with reference to FIGS. 11 to 13. FIG. 13 is a view showing the arrangement of the outline of the third embodiment in which the present invention is applied to a color video camera. The same reference numerals as in FIGS. 4 and 10 denote the same parts in FIG. 13, and an overlapping description will be omitted.

In this embodiment, a signal output from a pixel separation circuit 8 and a signal from which a high-frequency component is removed through a horizontal low-pass filter (H-LPF) 8a is supplied to a moire process circuit 9.

A process for digital video signals sequentially supplied from the pixel separation circuit 8 will be described below in detail.

In Equation (1) described above, the first term is an original luminance signal, and the second term is a false signal generated by a folding component. Conversions given by the following equations are performed to respective pixels of input lines:

$$W' = 2 \times W \times GL/(WL+GL)$$

$$G' = 2 \times G \times WL/(WL+GL)$$

$$Cy' = 2 \times Cy \times YeL/(CyL+YeL)$$

$$Ye' = 2 \times Ye \times CyL/(CyL+YeL)$$

Here, WL, GL, CyL, and YeL are the low-frequency components of output signals W, G, Cy, and Ye from the CCD, respectively. More specifically, the low-frequency components are calculated from several pixels after and before a target pixel, e.g., 5 to 15 pixels, through the horizontal low-pass filter 8a. The conversions are performed inside the moire process circuit 9.

When these conversions are performed, a low-frequency-region component SwL and a high-frequency-region component SwH of W of a signal of a WG line calculated from W', G', Cy', and Ye' obtained after conversion are given by the following equations:

$$SwL=2 \times W \times GL/(WL+GL)$$

$$SwH=2 \times W \times GL/(WL-GL)$$

On the other hand, a low-frequency-region component SgL and a high-frequency-region component SgH of W of the signal of the WG line are given by the following equations:

$$SgL=2 \times G \times WL/(WL+GL)$$

$$SgH=-2 \times G \times WL/(WL-GL)$$

Similarly, a low-frequency-region component ScyL and a high-frequency-region component ScyH of Cy of a signal of a CyYe line are given by the following equations:

$$ScL=2 \times Cy \times YeL/(CyL+YeL)$$

$$ScH=2 \times Cy \times YeL/(CyL-YeL)$$

In addition, a low-frequency-region component ScyL and a high-frequency-region component ScyH of Ye of the signal of the CyYe line are given by the following equations:

$$ScL=2 \times Ye \times CyL/(CyL+YeL)$$

$$SyH=-2 \times Ye \times CyL/(CyL-YeL)$$

Therefore, it is understood that folding components in the high-frequency regions have equal levels in the pixels. In a prior art, the luminance component is averaged by a low-pass filter. However, according to the present invention, the above operation is performed without performing addition in the horizontal direction.

Since the effect of a spectrum by the above operation is equivalent to the effect of a common spectrum component of each pixel, i.e., a G spectrum, the operation result is a process in a frequency band (luminance band) which does not influence color reproduction.

The above effect can also be obtained by using the following conversions:

$$W' = W \times (WL+GL)/(2 \times WL)$$

$$G = G \times (WL+GL)/(2 \times GL)$$

$$Cy' = Cy \times (CyL+YeL)/(2 \times CyL)$$

$$Ye' = Ye \times (CyL+YeL)/(2 \times YeL)$$

The same conversions as described above may be performed in the vertical direction. More specifically, the presence of a difference in the vertical direction is equivalent to the presence of a difference in the horizontal direction. The luminance of the WG line and the luminance of the CyYe line are represented by Yw and Yc, respectively, and conversions expressed by the following equations may be performed:

$$Yw'=Yw/(YwL+YcL)$$

$$Yc'=Yc/(Ywl+YcL)$$

Here, a letter L is also added to represent a low-frequency-region component.

The CCD solid state image pickup device having a color array including four pixels of W, G, Cy, and Ye as one unit has been described above. However, the present invention is not limited to this embodiment, and the above conversions are effective for a filter of another type. For example, even if a CCD solid state image pickup device having a color array including four pixels of Mg (magenta), G, Cy, and Ye, as shown in FIG. 12, as one unit, the same process as described above is effective. In this case, as a conversion process, conversions expressed by the following equations are performed:

$$Mg' = 2 \times Mg \times GL/(MgL+GL)$$

$$G' = 2 \times G \times MgL/(MgL+GL)$$

$$Cy' = 2 \times Cy \times YeL/(CyL+YeL)$$

$$Ye' = 2 \times Ye \times cYl/(CyL+YeL), \text{ or}$$

-continued $$Mg' = Mg \times (MgL + GL)/(2 \times MgL)$$
$$G' = G \times (MgL + GL)/(2 \times GL)$$
$$Cy' = Cy \times (CyL + YeL)/(2 \times CyL)$$
$$Ye' = Ye \times (CyL + YeL)/(2 \times YeL)$$

The present invention is not limited to the above embodiments, and various changes can be effected according to design or the like without departing from the spirit and scope of the present invention. The present invention can also be applied to an image pickup apparatus other than a video camera, e.g., a digital still camera. The reading system of the CCD can be applied to not only the all-pixel reading system but also other various reading systems. In the first embodiment, complementary color filters of W, G, Cy, and Ye are arranged on the CCD. However, the present invention can also be applied to a case wherein complementary color filters of Mg (magenta), G, Cy, and Ye are used.

In the arrangement of each of the above embodiments, a part for performing digital signal processing is expressed as a circuit arrangement. However, operations performed by these circuits can also be executed by software by means of a digital signal processors (DSP) or the like, as a matter of course. If the arrangement in which digital signal processing is realized by software is used, various set values and operations can be changed by changing the software, as a matter of course.

What is claimed is:

1. A video signal processing method of processing a luminance signal of a video signal generated by causing a solid state image pickup device to receive light transmitted through color filters, comprising the steps of:
    calculating an output signal from a specific pixel of the solid state image pickup device;
    calculating an average of output signals from all pixels of the solid state image pickup device;
    generating a control signal by a predetermined arithmetic operation using the output signal from the specific pixel and the average of the output signals from all the pixels of the solid state image pickup device; and
    performing a predetermined correction process to the luminance signal by using the control signal,
    wherein, in the step of calculating an output signal from a specific pixel of the solid state image pickup device, a low-frequency component of the output signal from the specific pixel is calculated.

2. A video signal processing method according to claim 1 wherein, in the step of calculating an average of output signals from all pixels of the solid state image pickup device, an average of low-frequency components of the output signals from all the pixels.

3. A video signal processing method according to claim 1, wherein, in the step of generating a control signal, the output signal from the specific pixel is divided by the output signals from all the pixels to generate the control signal.

4. A video signal processing method according to claim 1, further comprising the step of classifying the control signal in a plurality of stages;
    wherein, in the step of performing a predetermined correction process to the luminance signal by using the control signal, the predetermined correction process is performed to the luminance signal depending on the classified control signals of the respective stages.

5. A video signal processing method according to claim 4, wherein, in the step of performing a predetermined correction process to the luminance signal by using the control signal, the predetermined correction process is performed to a short-wavelength side of the luminance signal by the control signal, and the predetermined correction process is performed to a long-wavelength side of the luminance signal by an inverse of the control signal.

6. A video signal processing method according to claim 1, wherein, in the step of generating a control signal, the output signals from all the pixels are divided by the output signal from the specific pixel to generate a control signal.

7. A video signal processing method of processing a luminance signal of a video signal generated by causing a solid state image pickup device to receive light transmitted through color filters, comprising the steps of calculating an output signal from a first specific pixel of the solid state image pickup device;
    calculating an output signal from a second specific pixel of the solid state image pickup device;
    generating a control signal by a predetermined arithmetic operation using the output signal from the first specific pixel and the output signal from the second specific pixel of the solid state image pickup device; and
    performing a predetermined correction process to the luminance signal by using the control signal,
    wherein, in the steps of calculating output signals from first and second specific pixels of the solid state image pickup device, low-frequency components of the output signals from the first and second specific pixels are calculated.

8. A video signal processing method according to claim 7, wherein, in the step of generating a control signal, the output signal from the first specific pixel is divided by the output signal from the second specific pixel to generate the control signal.

9. A video signal processing method according to claim 7, wherein, in the step of performing a predetermined correction process to the luminance signal by using the control signal, the predetermined correction process is performed to a short-wavelength side of the luminance signal by the control signal, and the predetermined correction process is performed to a long-wavelength side of the luminance signal by an inverse of the control signal.

10. A video signal processing device for processing a luminance signal of a video signal generated by causing a solid state image pickup device to receive light transmitted through color filters, comprising:
    first signal operation means for calculating an output signal from a specific pixel of the solid state image pickup device;
    second signal operation means for calculating an average of output signals from all pixels of the solid state image pickup device;
    control signal generation means for generating a control signal by a predetermined arithmetic operation using the output signal from the specific pixel and the average of the output signals from all the pixels of the solid state image pickup device; and
    correction means for performing a predetermined correction process to the luminance signal by using the control signal,
    wherein the first signal operation means has low-frequency component extracting means for extracting a low-frequency component of the output from the specific pixel.

11. A video signal processing device according to claim 10, wherein the second signal operation means has low-frequency component extracting means for extracting low-frequency components of the output signals from all the pixels to calculate an average of the low-frequency components of the output signals from all the pixels.

12. A video signal processing device according to claim 10, wherein the control signal generation means has division means for dividing the output signal from the specific pixel by the output signals from all the pixels to generate a control signal.

13. A video signal processing device according to claim 10, further comprising classification means for classifying the control signal in a plurality of stages;
wherein the correction means performs the predetermined correction process to the luminance signal depending on the classified control signals of the respective stages.

14. A video signal processing device according to claim 10, wherein the control signal generation means has division means for dividing the output signals from all the pixels by the output from the specific pixel to generate a control signal.

15. A video signal processing device according to claim 14, wherein the correction means performs the predetermined correction process to a short-wavelength side of the luminance signal by the control signal and the predetermined correction process to a long-wavelength side of the luminance signal by an inverse of the control signal.

16. A video signal processing device for processing a luminance signal of a video signal generated by causing a solid state image pickup device to receive light transmitted through color filters, comprising:
first signal operation means for calculating an output signal from a first specific pixel of a solid state image pickup device;
second signal operation means for calculating an output signal from a second specific pixel of the solid state image pickup device;
control signal generation means for generating a control signal by a predetermined arithmetic operation using the output signal from the first specific pixel and the output signal from the second specific pixel of the solid state image pickup device; and
correction means for performing a predetermined correction process for a luminance signal by using the control signal,
wherein the first signal operation means has first low-frequency component extraction means for extracting a low-frequency component of the output from the first specific pixel, and the second signal operation means has second low-frequency component extraction means for extracting a low-frequency component of the output from the second specific pixel.

17. A video signal processing device according to claim 16, wherein, the control signal generation means divide the output signal from the first specific pixel by the output signal from the second specific pixel to generate a control signal.

18. A video signal processing device according to claim 16, wherein the correction means perform the predetermined correction process to a short-wavelength side of the video signal by the control signal and the predetermined correction process to a long-wavelength side of the video signal by an inverse of the control signal.

* * * * *